US009253598B2

(12) United States Patent
Lim et al.

(10) Patent No.: US 9,253,598 B2
(45) Date of Patent: Feb. 2, 2016

(54) METHOD FOR MEASURING LOCATION OF TERMINAL IN WIRELESS NETWORK AND DEVICE THEREFOR

(71) Applicant: LG ELECTRONICS INC., Seoul (KR)

(72) Inventors: Dongguk Lim, Anyang-si (KR); Hangyu Cho, Anyang-si (KR); Jiwon Kang, Anyang-si (KR); Sungho Park, Anyang-si (KR); Dongcheol Kim, Anyang-si (KR); Jiwoong Jang, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 14/410,477

(22) PCT Filed: Jun. 25, 2013

(86) PCT No.: PCT/KR2013/005605
§ 371 (c)(1),
(2) Date: Dec. 22, 2014

(87) PCT Pub. No.: WO2014/003414
PCT Pub. Date: Jan. 3, 2014

(65) Prior Publication Data
US 2015/0373491 A1    Dec. 24, 2015

Related U.S. Application Data

(60) Provisional application No. 61/664,132, filed on Jun. 25, 2012.

(51) Int. Cl.
*H04W 24/00* (2009.01)
*H04W 4/02* (2009.01)

(52) U.S. Cl.
CPC .............. *H04W 4/023* (2013.01); *H04W 4/027* (2013.01)

(58) Field of Classification Search
CPC ...................................................... H04W 24/00
See application file for complete search history.

(56) References Cited

FOREIGN PATENT DOCUMENTS

| JP | 2005-337872 A | 12/2005 |
| JP | 2007-127584 A | 5/2007 |
| JP | 2010-216811 A | 9/2010 |
| JP | 2012-26851 A | 2/2012 |
| KR | 10-1134149 B1 | 4/2012 |

*Primary Examiner* — Tammy Pham
*Assistant Examiner* — Idowu O Osifade
(74) *Attorney, Agent, or Firm* — Birch, Stewart, Kolasch & Birch, LLP

(57) ABSTRACT

A method for measuring, by a terminal, the location of a terminal in a wireless network according to the present invention includes the steps of: determining based on a received signal whether the number of access points (APs) that transmit the signal is three or more; storing location information on a first AP obtained based on the received signal and distance information between the terminal and the first AP at a point receiving the signal if the number of the APs is less than three; measuring a travel distance and a travel direction according to the movement of the terminal from the point receiving the signal; obtaining, based on the signals received from a second and a third AP, location information on the second and third APs and distance information between the terminal and each of the second and third APs at the current point, if it is determined that the number of the APs that transmit signals from the current point according to the movement to the terminal is three or more; and calculating the location of the current point of the terminal based on the distance information between the terminal and each of the second and third APs at the current point, distance information between the terminal and the first AP, and the measured travel distance and the measured travel direction.

7 Claims, 8 Drawing Sheets

METHOD FOR MEASURING LOCATION OF TERMINAL IN WIRELESS NETWORK AND DEVICE THEREFOR

CROSS REFERENCE TO RELATED APPLICATIONS

This application is the National Phase of PCT International Application No. PCT/KR2013/005605, filed on Jun. 25, 2013, which claims priority under 35 U.S.C. 119(e) to U.S. Provisional Application No. 61/664,132, filed on Jun. 25, 2012, all of which are hereby expressly incorporated by reference into the present application.

TECHNICAL FIELD

The present invention relates to a location measurement in wireless communication, and more particularly, to a method for estimating a location of a user equipment if the user equipment is located indoors in a wireless network.

BACKGROUND ART

An assisted global positioning system (A-GPS) is a satellite-based positioning system that can under certain conditions (mostly, when a data link with a server is established) improve a GPS startup speed and reduce time to first fix (TTTF) (which is a time taken to fix a data link with an artificial satellite). An A-GPS is mainly used in a user equipment (UE) (e.g., a cellular phone or a smart phone) having a built-in GPS and was developed by Federal Communications Commission in order to transmit location information during 911 emergency calls.

A UE can support location information to a user via A-GPS technologies. A-GPS technologies are location information service technologies that are mainly used in 3rd generation partnership project (3GPP) standard and currently provide many services to subscribers. In simpler terms, the UE receives GPS (which corresponds to A-GNSS in terms of 3GPP) satellite information and transmits or receives location related information of a base station (BS) based on the GPS satellite information to receive accurate location information through a server that manages location information of the BS.

A-GPS technologies have been already used to provide more accurate location information using information received by a UE from a GPS via communication with a server that manages location information of a BS. Recently, A-GPS technologies have been mainly used in fields of wideband code division multiple access (WCDMA) of 3GPP standard or code division multiple access (CDMA) of 3GPP2 standard. In areas where UEs cannot easily receive location information, locations are estimated using satellite information alone, which is disadvantageously less accurate than A-GPS technologies. In addition, time required to acquire location information may be changed according to an area.

From the Cold War with the Soviet Union, the United States launched many artificial satellites out of the earth in order to spy upon the Soviet Union. These satellites periodically transmit location information to the earth at a specific frequency. When a UE receives location information to estimate a location, errors corresponding to several hundred meters may be experienced. Accordingly, for more accurate estimation and error reduction, a UE accesses a location information server of a BS using information received from a GPS to obtain a more accurate location, which is called A-GPS technologies. In general, an error range is reduced within several meters even if accuracy is changed according to a location of a UE within an area managed by a BS.

However, according to these technologies, problems arise in terms of location acquisition when a UE fails to receive GPS signals. Of course, when the UE is located in a building, the UE can receive GPS signals through antennas installed outdoors. However, currently, this reception is significantly limited, and thus, many problems arise in areas where GPS signals cannot be received, such as indoors or underground. In this case, it is very difficult to acquire accurate location information by the UE in reality.

Also, if the UE fails to detect three or more APs indoors, it is impossible to measure a location indoors except the GPS system. The present invention is intended to suggest a detailed method for solving the problems.

DISCLOSURE

Technical Problem

An object of the present invention is to provide a method for measuring a location of a user equipment in wireless network.

Another object of the present invention is to provide a device for measuring a location of a user equipment in wireless network.

It will be appreciated by persons skilled in the art that the objects that could be achieved with the present invention are not limited to what has been particularly described hereinabove and the above and other objects that the present invention could achieve will be more clearly understood from the following detailed description.

Technical Solution

To solve the aforementioned technical problem, according to one embodiment of the present invention, a method for measuring a location of a user equipment in a wireless network comprises the steps of determining, based on received signals, whether the number of access points (APs) that transmit the signals is three or more; storing location information of a first AP obtained based on the received signals and distance information between the user equipment and the first AP at a point where the signals are received, if the number of the APs is less than three; measuring a movement distance and a movement direction according to the movement of the user equipment from the point where the signals are received; obtaining, based on the signals received from a second AP and a third AP, current location information of the second and third APs and distance information between the user equipment and each of the second and third APs at a current point, if it is determined that the number of the APs that transmit signals at the current point according to the movement to the user equipment is three or more; and calculating a location of the current point of the user equipment based on the distance information between the user equipment and each of the second and third APs at the current point, the distance information between the user equipment and the first AP, and the measured movement distance and the measured movement direction. In the method, the step of calculating the location of the current point of the user equipment includes calculating a location (x', y') of the current point of the user equipment through the following Equation A:

$$(D_1+D_4)=\sqrt{(x_1-x')^2+(y_1-y')^2}$$
$$D_2=\sqrt{(x_2-x')^2+(y_2-y')^2}$$
$$D_3=\sqrt{(x_3-x')^2+(y_3-y')^2}, \quad \text{[Equation A]}$$

where $D_1$, $D_2$, and $D_3$ respectively represent the distances between each of the first AP, the second AP and the third AP and the user equipment, $D_4$ represents the movement distance of the user equipment, which is measured in accordance with the movement of the user equipment, and $(x_1,y_1)$, $(x_2,y_2)$ and $(x_3,y_3)$ respectively represent locations of the first AP, the second AP and the third AP.

In the method, the user equipment is located indoors. The step of determining, based on the received signals, whether the number of APs that transmit the signals is three or more may include determining whether the number of AP identifiers detected as a result of decoding performed by the user equipment is three or more.

To solve the aforementioned technical problem, according to another embodiment of the present invention, a method for measuring a location of a user equipment in a wireless network comprises the steps of determining, based on received signals, whether the number of access points (APs) that transmit the signals is three or more; storing location information of a first AP obtained based on the received signals and distance information between the user equipment and the first AP at a point where the signals are received, if the number of the APs is less than three; measuring a movement distance and a movement direction according to the movement of the user equipment from the point where the signals are received; calculating a virtual location of the first AP by using the measured movement distance and movement direction from the obtained location information of the first AP if it is determined that the number of APs that transmit the signals to the user equipment is three or more; obtaining, based on signals received from a second AP and a third AP at a current point based on the movement, location information on the second and third APs and distance information between the user equipment and each of the second and third APs at the current point; and calculating a location of the current point of the user equipment based on the virtual location of the first AP, the location information of the second and third APs, and the distance information between the user equipment and each of the second and third APs at the current point.

In the method, the step of calculating the location of the current point of the user equipment includes calculating a location (x', y') of the current point of the user equipment through the following Equation B:

$$(X'_a, Y'_a) = (X_a + X_D, Y_a + Y_D)$$

$$(X'_a, Y'_a) = (X_a + (X'-X), Y_a + (Y'-Y))$$

$$D_2 = \sqrt{(x_2-x')^2 + (y_2-y')^2}$$

$$D_3 = \sqrt{(x_3-x')^2 + (y_3-y')^2}, \qquad \text{[Equation B]}$$

where $(X_D = X'-X)$, $Y_D = (Y'-Y)$, $(X_D, Y_D)$ is a value added considering relative movement based on relative movement distance and movement direction according to the movement of the user equipment, (X,Y) represents a location obtained by measuring the distance between the user equipment and the first AP, (X', Y') represents the current location (location where AP2 and AP3 signals are received at the same time) of the user equipment, $(X_a, Y_a)$ represents the location (=location obtained by measuring the distance between the user equipment and the first AP) of the first AP, $(X'_a, Y'_a)$ represents the virtual location of the first AP, (x2, y2) is a location of the second AP, and (x3, y3) is a location of the third AP.

In the method, the step of determining, based on the received signals, whether the number of APs that transmit the signals is three or more may include determining whether the number of AP identifiers detected as a result of decoding performed by the user equipment is three or more.

To solve the aforementioned technical problem, according to still another embodiment of the present invention, a user equipment for measuring a location in a wireless network comprises a location information module determining, based on received signals, whether the number of access points (APs) that transmit the signals is three or more; a memory storing location information of a first AP obtained based on the received signals and distance information between the user equipment and the first AP at a point where the signals are received, if the number of the APs is less than three; and a sensor measuring a movement distance and a movement direction according to the movement of the user equipment from the point where the signals are received, wherein the location information module is configured to obtain, based on the signals received from a second AP and a third AP, current location information of the second and third APs and distance information between the user equipment and each of the second and third APs at a current point, if it is determined that the number of the APs that transmit signals at the current point according to the movement to the user equipment is three or more, and is configured to calculate a location of the current point of the user equipment based on the distance information between the user equipment and each of the second and third APs at the current point, the distance information between the user equipment and the first AP, the measured movement distance, and the measured movement direction.

To solve the aforementioned technical problem, according to further still another embodiment of the present invention, a user equipment for measuring a location in a wireless network comprises a location information module determining, based on received signals, whether the number of access points (APs) that transmit the signals is three or more; a memory storing location information of a first AP obtained based on the received signals and distance information between the user equipment and the first AP at a point where the signals are received, if the number of the APs is less than three; and a sensor measuring a movement distance and a movement direction according to the movement of the user equipment from the point where the signals are received, wherein the location information module is configured to calculate a virtual location of the first AP by using the measured movement distance and movement direction from the obtained location information of the first AP if it is determined that the number of APs that transmit the signals to the user equipment is three or more, is configured to obtain, based on the signals received from a second AP and a third AP at a current point based on the movement, location information of the second and third APs and distance information between the user equipment and each of the second and third APs at the current point, and is configured to calculate a location of the current point of the user equipment based on the virtual location of the first AP, the location information of the second and third APs, and the distance information between the user equipment and each of the second and third APs at the current point.

Advantageous Effects

The method for measuring a location according to various embodiments of the present invention may be applied to even a case that the number of APs (ex, reference points) for location estimation is reduced due to movement of a user equipment that currently performs location estimation as well as a case that the number of APs for location estimation is insufficient.

It will be appreciated by persons skilled in the art that that the effects that could be achieved with the present invention are not limited to what has been particularly described hereinabove and other advantages of the present invention will be more clearly understood from the following detailed description.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

BEST MODE FOR CARRYING OUT THE INVENTION

Figure 1:
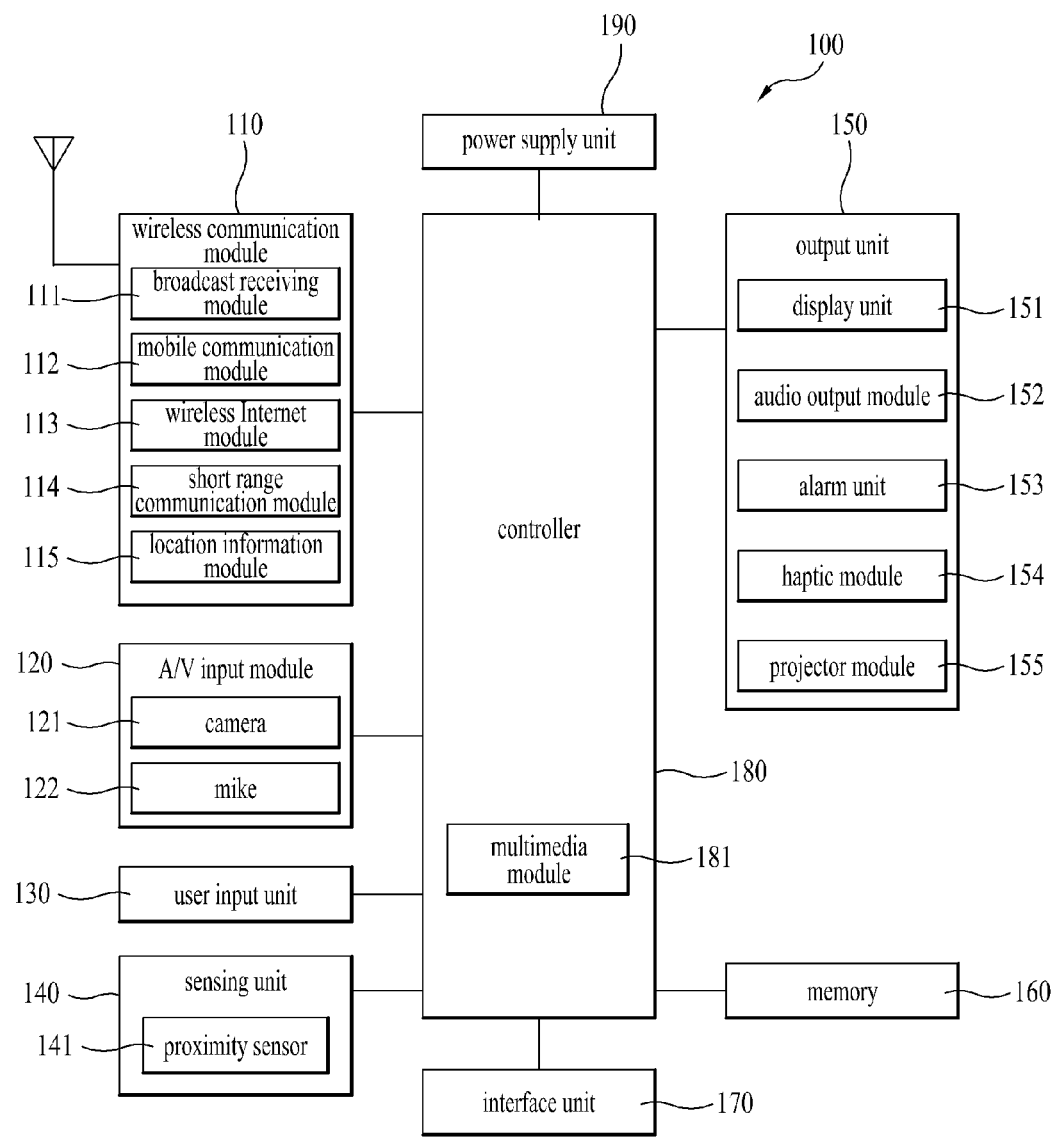
FIG. 1 is a block diagram briefly illustrating a configuration of a user equipment according to the present invention.

Reference will now be made in detail to the exemplary embodiments of the present invention with reference to the accompanying drawings. The detailed description, which will be given below with reference to the accompanying drawings, is intended to explain exemplary embodiments of the present invention, rather than to show the only embodiments that can be implemented according to the invention. The following detailed description includes specific details in order to provide a thorough understanding of the present invention. However, it will be apparent to those skilled in the art that the present invention may be practiced without such specific details. For example, the following description focuses upon a case in which a mobile communication system is a 3rd generation partnership project (3GPP) long term evolution (LTE) system or a LTE-advanced (LTE-A) system. However, the present technical features, aside from unique features of 3GPP LTE and LTE-A can be applied to any other mobile system.

In some instances, well-known structures and devices are omitted in order to avoid obscuring the concepts of the present invention and important functions of the structures and devices are shown in block diagram form. The same reference numbers will be used throughout the drawings to refer to the same or like parts.

In addition, in the following description, it is assumed that a user equipment (UE) refers to any mobile or fixed type device of a user side, such as a user equipment, a mobile station (MS), an advanced mobile station (AMS), etc., and that a base station (BS) refers to any node of a network side that communicates with the UE, such as a Node B, an eNode B, a base station, AP (Access Point), etc. Throughout this specification, the technical features of the present invention are described based on an institute of electrical and electronic engineers (IEEE) 802.16 system, but can be applied to various other communication systems.

In a mobile communication system, a UE may receive information from a BS in downlink and transmit information in uplink. The information transmitted or received by the UE may be data and various control information. In addition, there are various physical channels according to the type or use of the information transmitted or received by the UE.

The following technical features can be applied to a variety of wireless access technologies, for example, code division multiple access (CDMA), frequency division multiple access (FDMA), time division multiple access (TDMA), orthogonal frequency division multiple access (OFDMA), single carrier frequency division multiple access (SC-FDMA), and the like. CDMA may be embodied through radio technology such as universal terrestrial radio access (UTRA) or CDMA2000. TDMA may be embodied through radio technology such as global system for mobile communication (GSM)/general packet radio service (GPRS)/enhanced data rates for GSM evolution (EDGE), etc. OFDMA may be embodied through radio technology such as IEEE 802.11 (Wi-Fi), IEEE 802.16 (WiMAX), IEEE 802-20, evolved UTRA (E-UTRA), and the like. UTRA is a part of a universal mobile telecommunications system (UMTS). 3GPP LTE is a part of evolved UMTS (E-UMTS), which uses E-UTRA. The 3GPP LTE employs OFDMA in downlink and employs SC-FDMA in uplink. LTE advanced (LTE-A) is an evolved version of 3GPP LTE.

Specific terms used in the embodiments of the present invention are provided to aid in the understanding of the present invention. These specific terms may be replaced with other terms within the scope and spirit of the present invention.

FIG. 1 is a schematic block diagram of a structure of a UE 100 according to the present invention.

Throughout this specification, a UE is not limited to a cellular phone as a telephone illustrated in the FIG. 1 and can be broadly applied to a smart phone, a notebook computer, a digital broadcast terminal, a personal digital assistant (PDA), a portable multimedia player (PMP) a navigation device, and the like. Thus, it can be understood that the UE includes any portable electronic product. The UE 100 may include a wireless communication unit 110, an audio/video (A/V) input unit 120, a user input unit 130, a sensing unit 140, an output unit 150, a memory 160, an interface unit 170, a controller 180, a power supply unit 190, etc. When these components are embodied in actual applications, two or more components are combined to constitute one component or one component is divided into two or more components, as necessary.

Hereinafter, these components will be sequentially described.

The UE 100 may include the wireless communication unit 110, the A/V input unit 120, the user input unit 130, the sensing unit 140, the output unit 150, the memory 160, the interface unit 170, the controller 180, the power supply unit 190, etc. The components illustrated in FIG. 1 are not required. Thus, greater or fewer components than in FIG. 1 may constitute the UE 100.

Hereinafter, these components will be sequentially described.

The wireless communication unit 110 may include one or more modules that can allow wireless communication between the UE 100 and a wireless communication system or between the UE 100 and a network in which the UE 100 is located. For example, the wireless communication unit 110 may include a broadcast receiving module 111, a mobile communication module 112, a wireless Internet module 113, a short range communication module 114, a location information module 115, etc.

The broadcast receiving module 111 receives a broadcast signal and/or broadcast related information from an external broadcast management server through a broadcast channel. The broadcast channel may include a satellite channel and a terrestrial channel. The broadcast management server may refer to a server that generates and transmits a broadcast signal and/or broadcast related information or a server that receives a pre-generated broadcast signal and/or broadcast related information and transmits the pre-generated broadcast signal and/or broadcast related information to a UE. The broadcast signal may include a broadcast signal formed by adding a data broadcast signal to a television (TV) broadcast signal or a radio broadcast signal as well as a TV broadcast signal, a radio broadcast signal, and a data broadcast signal.

The broadcast related information may refer to information regarding a broadcast channel, a broadcast program, or a broadcast service provider. The broadcast related information may be provided through a mobile communication network. In this case, the broadcast related information may be received by the mobile communication module 112.

A variety of types of broadcast related information may be present. For example, the broadcast related information may be present in the form of electronic program guide (EPG) of digital multimedia broadcasting (DMB), electronic service guide (ESG) of digital video broadcast-handheld (DVB-H), or the like.

The broadcast receiving module 111 may receive a digital broadcast signal using a digital broadcast system, for example, digital multimedia broadcasting-terrestrial (DMB-T), digital multimedia broadcasting-satellite (DMB-S), media forward link only (MediaFLO), digital video broadcast-handheld (DVB-H), DVB-CBMS, OMA-BCAST, integrated services digital broadcast-terrestrial (ISDB-T), etc. Of course, the broadcast receiving module 111 may be adapted to other broadcast systems as well as the aforementioned digital broadcast system.

The broadcast signal and/or broadcast related information received by the broadcast receiving module 111 may be stored in the memory 160.

The mobile communication module 112 transmits and receives a wireless signal to and from at least one of a BS, an external UE, and a server on a mobile communication network. The wireless signal may include a voice call signal, a video telephony call signal, and/or data in various forms according to transmission and reception of text/multimedia messages. The wireless Internet module 113 may refer to a module for wireless Internet access and may be installed internally or externally on the UE 100. As a wireless Internet technology, wireless LAN (WLAN) (Wi-Fi), wireless broadband (Wibro), world interoperability for microwave access (Wimax), high speed downlink packet access (HSDPA), etc. may be used.

The short range communication module 114 refers to a module for short range communication. As short range communication technologies, Bluetooth, radio frequency identification (RFID), infrared data association (IrDA), ultra wideband (UWB), ZigBee, etc. may be used.

The location information module 115 is a module for acquisition of location information of a UE. A representative example of the location information module 115 may include a global positioning system (GPS) module and an inertial sensor. According to current technologies, the GPS module may calculate information regarding distances from three or more modules and accurate time information and apply trigonometry to the calculated information to accurately calculate current location information according to latitude, longitude, and altitude. Currently, a method of calculating location and time information using three satellites and calibrating errors of the calculated position and time information using another satellite has been extensively used. In addition, the GPS module may continuously calculate a current location in real time to calculate velocity information. The inertial sensor calculates a relative location value by measuring a movement distance at a reference point using an accelerometer and by measuring a movement direction using a gyroscope. The inertial sensor will be described in more detail.

Referring to FIG. 1, the A/V input unit 120 is used to input an audio signal or a video signal and may include a camera 121 and a microphone 122. The camera 121 processes image frames of still images or moving pictures obtained by an image sensor in a video telephony mode or a photograph mode. The processed image frames may be displayed by a display unit 151. The image frames processed by the camera 121 may be stored in the memory 160 or externally transmitted through the wireless communication unit 110. The UE 100 may include two or more cameras 122 according to service environment.

The microphone 122 receives an external audio signal in a call mode, a recording mode, a voice recognition mode, or the like and processes the received audio signal into electrical voice data. In the call mode, the processed voice data is converted into a form in which the data can be transmitted to a mobile communication BS through the mobile communication module 112 and output. The microphone 122 may employ various noise removal algorithms for removal of noise generated when the external audio signal is received.

The user input unit 130 generates input data for control of an operation of the UE 100 from a user. The user input unit 130 may receive a signal indicating two or more content items among displayed content items, according to the present invention. In addition, the signal indicating the two or more content items may be received through touch input or hard and soft key input. The user input unit 130 may receive input for selection of one or two or more content items from the user. In addition, the user input unit 130 may receive input for generation of an icon related to a function performed by the UE 100. The user input unit 130 may include a direction key, a key pad, a dome switch, a touch pad (constant voltage/capacitance), a jog wheel, a jog switch, and so on.

The sensing unit 140 may sense a current state of the UE 100 such as an open/close state of the UE 100, a location of the UE 100, whether a user touches the UE 100, a direction of the UE 100, and acceleration/deceleration of the UE 100 to generate a sensing signal for control of the operation of the UE 100. For example, when the UE 100 is a slide phone, the sensing unit 140 may sense whether the slide phone is opened or closed. In addition, the sensing unit 140 may sense whether the power supply unit 190 supplies power and whether the interface unit 170 is connected to an external device. The sensing unit 140 may include a proximity sensor 141. The proximity sensor 141 will be described below with regard to a touchscreen.

The output unit 150 may generate visual, auditory, or tactile output and may include the display unit 151, an audio output module 152, an alarm unit 153, a haptic module 154, and a projector module 155. The display unit 151 may display (output) information processed by the UE 100. For example, when the UE 100 is in a call mode, the display unit 151 displays a user interface (UI) or a graphical user interface (GUI) related to a telephone call. When the UE 100 is in a video telephony mode or a photograph mode, the display unit 151 displays a captured and/or received image, a UI, or a GUI. The display unit 151 may include at least one of a liquid crystal display (LCD), a thin film transistor-liquid crystal display (TFT LCD), an organic light-emitting diode (OLED), a flexible display, and a three-dimensional (3D) display. Among these, some displays may be a transparent type or a light transmission type display such that a user can view an object behind the display therethrough. In this case, these displays may be called a transparent display. A representative example of the transparent display may include a transparent OLED (TOLED) and the like. The display unit 151 may be configured to have a rear structure or a light transmission structure. Due to these structures, the user can view an object located behind a body of the UE 100 through a transparent area of the body of the UE 100, which is occupied by the display unit 151. The UE 100 may include two or more display units 151 according to an embodiment type of the UE 100. For example, the UE 100 may include a plurality of display units that are arranged or integrated on one surface at a predetermined distance or arranged on different surfaces. When the display unit 151 and a sensor (hereinafter, referred to as a 'touch sensor') for detection of a touch operation form a layered structure (hereinafter, referred to as a 'touchscreen'), the display unit 151 may be used as an input device as well as an output device. For example, the touch sensor may be in the form of a touch film, a touch sheet, a touch pad, and so on.

The touch sensor may convert variation in pressure applied to a specific portion of the display unit 151 or variation in capacitance generated at a specific portion of the display unit 151 into an electrical input signal. The touch sensor may sense pressure of touch as well as a location and area of the touch. When touch input to the touch sensor is present, a signal (signals) corresponding to the touch input is transmitted to a touch controller (not shown). The touch controller processes the signal (signals) and then transmits data corresponding to the processed signal to the controller 180. Thus, the controller 180 may recognize a touched portion of the display unit 151.

The proximity sensor 141 may be disposed in an internal region of the UE 100, surrounded by the touchscreen, or near the touchscreen. The proximity sensor 141 refers to a sensor that senses an object approaching a predetermined sensing surface or an object located near the proximity sensor 141 using an electromagnetic force or infrared rays without having mechanical contact. The proximity sensor 141 may have a longer lifetime than a contact sensor, thus having a wider range of applications. An example of the proximity sensor 141 may include a transmission type photoelectric sensor, a direct reflection type photoelectric sensor, a mirror reflection type photoelectric sensor, a high-frequency oscillating proximity sensor, a capacitive proximity sensor, a magnetic proximity sensor, an infrared proximity sensor, etc. When the touchscreen is of a capacitance type, the proximity sensor 141 may be configured to detect proximity of a pointer through variation in an electric field according to proximity of the pointer. In this case, the touchscreen (or a touch sensor) may be classified as a proximity sensor. Hereinafter, for convenience of description, an action of allowing recognition of presence of the pointer on the touchscreen via the pointer approaching the touchscreen without actually touching the touchscreen will be referred to a "proximity touch" and an action of actually bringing the pointer into contact with the touchscreen will be referred to a "contact touch". In this case, a point at which the proximity touch occurs corresponds to a point of the touchscreen, in which the point is imaginarily projected during the proximity touch. The proximity sensor 141 senses the proximity touch and a proximity touch pattern (e.g., a proximity touch distance, a proximity touch direction, a proximity touch velocity, a proximity touch time, a proximity touch position, a proximity touch moving state, etc.). Information corresponding to the sensed proximity touch action and proximity touch pattern may then be displayed on the touchscreen.

The audio output module 152 may output audio data received from the wireless communication unit 110 or stored in the memory 160 in a call signal receiving mode, a telephone call mode, a recording mode, a voice recognition mode, or a broadcasting receiving mode. The audio output module 152 may output audio signals related to functions (e.g., a ringtone, a message tone, etc.) performed by the UE 100. The audio output module 152 may include a receiver, a speaker, a buzzer, etc.

The alarm unit 153 outputs a signal indicating generation of an event of the UE 100. For example, alarms may be generated upon receiving a call signal, receiving a message, inputting a key signal, inputting touch, etc. The alarm unit 153 may also output signals in forms different from video signals or audio signals, for example, a signal for indicating generation of an event may be generated through vibration. The video signals or the audio signals may also be output through the display unit 151 or the audio output module 152. Thus, the display unit 151 and the audio output module 152 may be classified as a type of the alarm unit 153.

The haptic module 154 generates various haptic effects that the user can feel. A representative example of the haptic effect generated by the haptic module 154 is vibration. An intensity and pattern of vibration generated by the haptic module 154 may also be controlled. For example, different vibrations may be combined and output or can be sequentially output.

The haptic module 154 may generate a variety of haptic effects including an effect of stimulus according to arrangement of pins vertically moving against a contact skin surface, an effect of stimulus according to a jet force or suction force of air through a jet hole or a sucking suction hole, an effect of stimulus of rubbing the skin, an effect of stimulus according to contact of an electrode, an effect of stimulus using an electrostatic force, and an effect according to a reproduction of cold and warmth using an element that can absorb or radiate heat as well as vibrations. The haptic module 154 may not only transmit haptic effects through direct contact but may also allow the user to feel haptic effects through a kinesthetic sense of the user's fingers or arms. The UE 100 may include two or more haptic modules 154 according to an embodiment type of the UE 100. The projector module 155 performs a function of projecting an image using the UE 100 and may display an image, which is the same as or partially different from an image displayed on the display unit 151, on an external screen or a wall according to a control signal of the controller 180.

In detail, the projector module 155 may include a light source (not shown) for generating light (e.g., a laser beam) for externally outputting an image, an image generator (not shown) for generating an image to be externally output using the light generated by the light source, and a lens (not shown) for enlarging and externally outputting an image from a predetermined focal distance. In addition, the projector module 155 may include a device (not shown) for mechanically moving the lens or the projection module 155 to adjust an image projection direction. The projector module 155 may be classified into a cathode ray tube (CRT) module, a liquid crystal display (LCD) module, a digital light processing (DLP) module, and so on according to a display device type. In particular, the DLP module uses a method of enlarging and projecting an image generated by reflecting the light generated by the light source by a digital micromirror device (DMD) chip, and may be advantageous in terms of miniaturization of the projector module 155. Preferably, the projector module 155 may be installed on a lateral surface, a front surface, or a rear surface of the UE 100 in a longitudinal direction thereof. Of course, the projector module 155 may be installed at any location of the UE 100 as necessary.

The memory 160 may store a program for processes and control of the controller 180 and may temporally store input/output data (e.g., phone book, messages, audio, still images, moving pictures, etc.). The memory 160 may also store frequency of use of each data (e.g., frequency of use of each telephone number, each message, and each multimedia). In addition, the memory 160 may store data about vibration and sounds in various patterns that are output when touch input is applied to the touchscreen.

The memory 160 may include at least one of storage media such as a flash memory, a hard disk type memory, a multimedia card micro type memory, a card type memory (e.g., an SD or XD memory), a random access memory (RAM), a static random access memory (SRAM), a read-only memory (ROM), an electrically erasable programmable read-only memory (EEPROM), a programmable read-only memory (PROM), magnetic memory, a magnetic disk, and an optical disk. The UE 100 may also operate in relation to a web storage that performs a storing function of the memory 160 on the Internet.

The interface unit 170 may serve as a path to external devices connected to the UE 100. The interface unit 170 may receive data from the external devices or power and transmit the data or power to internal components of the UE 100 or transmit data of the UE 100 to the external devices. For example, the interface unit 170 may include a wired/wireless headset port, an external charger port, a wired/wireless data port, a memory card port, a port for connecting a device having an identification module, an audio I/O port, a video I/O port, an earphone port, etc., for example.

The identification module is a chip that stores various information for authentication of an authority of the UE 100 and may include a user identify module (UIM), a subscriber identify module (SIM), a universal subscriber identity module (USIM), etc. A device (hereinafter, referred to as an 'identification device') including the identification module may be manufactured in the form of a smart card. Thus, the identification module may be connected to the UE 100 through a port. The interface unit 170 may also be a path through which power from an external cradle is supplied to the UE 100 when the UE 100 is connected to the external cradle or a path through which various command signals input by the user through the cradle are transmitted to the UE 100. The various command signals or power input from the cradle may be used as signals for confirming whether the UE 100 is accurately set in the cradle. The controller 180 may control overall operations of the UE 100. For example, the controller 180 may perform control and processing for voice communication, data communication, video telephony, etc. The controller 180 may include a multimedia module 181 for reproduction of multimedia. The multimedia module 181 may be internally embodied in the controller 180 or separately embodied from the controller 180.

The controller 180 may perform a pattern recognition process via which handwriting input or picture-drawing input applied to the touch screen is recognized as characters or images.

The power supply unit 190 may receive external power and internal power and supply power required for operations of the components according to control of the controller 180.

Prior to the description of embodiments of the present invention, several positioning methods will now be described. First of all, a triangulation and a WiFi Positioning System (WPS) (fingerprinting) will be described as examples of a positioning method.

Figure 2:
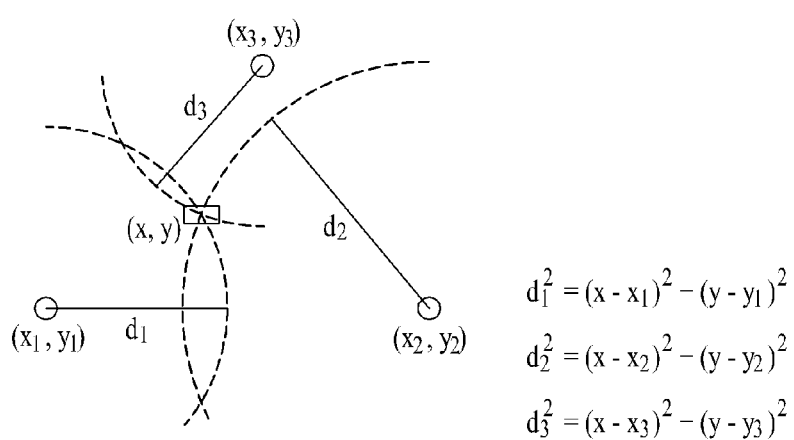
FIG. 2 is a diagram illustrating a triangular method of several positioning methods.

FIG. 2 is a diagram illustrating a triangular method of several positioning methods.

The triangular method needs at least three or more reference points to estimate a real-time location of an entity, and is the method for estimating a location by calculating each distance from the three or more reference points and discovering a mutual crossing point as expressed in FIG. 2. A location (xy, yu) of the user equipment may be calculated in accordance with a recursive least-square (LS) method by using the Equations expressed in FIG. 2. A method for measuring a distance, which is used for the triangular method, may be expressed as follows.

a. RSSI (Received Signal Strength Indication)

A distance between two points may be obtained as follows by using a formula of Friss.

$$L = 20\log_{10}\left(\frac{4\pi d}{\lambda}\right)[\text{dB}] \quad d = \frac{\lambda}{4\pi} \cdot 10^{\frac{L}{20}} = \frac{c}{4\pi f} \cdot 10^{\frac{L}{20}}$$

b. ToA (Time of Arrival)

The location of the user equipment may be calculated by measuring signal transmission time between a plurality of APs of which locations are known and the user equipment. The distance between the AP and the user equipment may be calculated by exact time synchronization therebetween.

Figure 3:
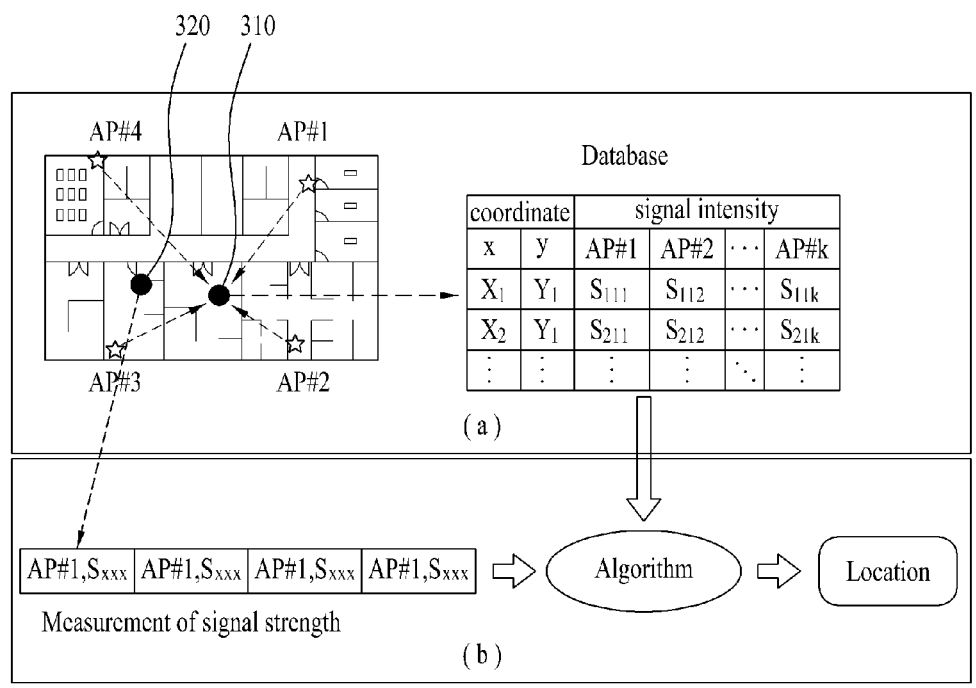
FIG. 3 is a diagram illustrating a finger printing location measurement scheme in a WiFi positioning system.

FIG. 3 is a diagram of a positioning method of fingerprinting by a WiFi Positioning System (WPS).

The fingerprinting is a method based on empirical data, in which an area which is subjected to positioning is divided into regions in the cell form or various forms, values of signals transmitted from an access point (AP) are measured at each reference point of the regions, and the values are stored in the form of database. After the database of received signals is established, a signal value measured via actual positioning and a value stored in the database are compared with each other to determine a location.

That is, the fingerprinting may broadly include two steps. In a first step, an area which is subjected to location estimation is divided into regions in the specific form, intensity of a signal of the AP at each reference point of the regions is measured, and data are collected based on the measured signal intensity. In a second step, an actual location is estimated using a specific algorithm based on data stored in the form of database and signal values transmitted from the AP, which are measured actually.

FIG. 3(A) is a diagram for explanation of a step of collecting a signal for location estimation, in which a UE measures values of signals received from a plurality of APs AP1, AP2, AP3, and AP4 at a specific reference point 310 and establishes database. FIG. 3(B) illustrates a step of estimating a current location by applying intensity of signals measured at a measurement point 320 and intensity of signals stored in the database to an algorithm. The WPS based on fingerprinting does not require time synchronization for location estimation, and multipath components according to environment are contained in database. Thus, the WPS system is advantageous to accurately estimate a location indoors. However, the WPS is disadvantageous in that database needs to be established for service areas and to be updated according to change in internal environment (e.g., AP movement, etc.). Next, an inertial positioning method as another positioning method will be described in brief.

Figure 4:
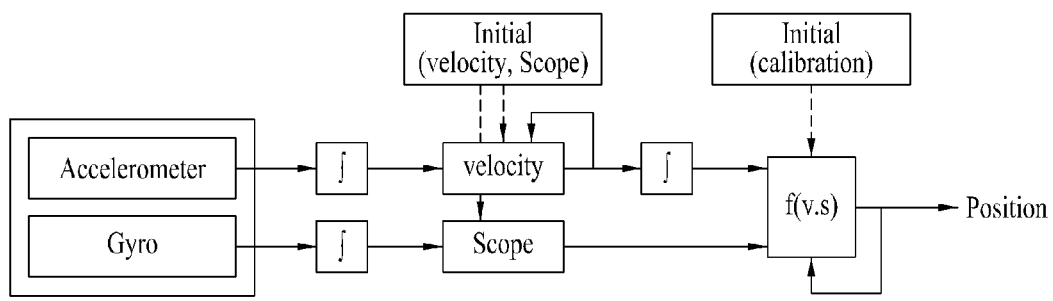
FIG. 4 is a diagram illustrating positioning through an accelerometer and a gyroscope.

FIG. 4 is a diagram for explanation of positioning via an accelerometer and a gyroscope.

Referring to FIG. 4, an inertial sensor may include an accelerometer (an acceleration sensor) and a gyroscope (an angular velocity sensor). In general, the present method is a method of calculating a relative location value by measuring a movement distance at a reference point using an accelerometer and by measuring a movement direction using a gyroscope. According to the positioning using the inertial sensor, the current location is estimated based on the values calculated by the accelerometer and the value calculated by the gyroscope by using an algorithm.

Location estimation using the inertial sensor is performed using the following method. First, the movement distance may be recognized by performing integration on a value measured by the accelerometer and the movement direction may be recognized by performing integration on a value measured by the gyroscope. Since the movement distance and the movement direction are recognized using the inertial sensor, a movement point on coordinates may be recognized, thereby enabling positioning. The inertial sensor based positioning calculates a relative movement value with respect to a reference point, and thus, various errors may be experienced. For example, errors due to the precision of the reference point, errors of the inertial sensor itself (e.g., a temperature or bias), and errors due to movement (e.g., a behavior pattern, a movement pattern, and a rotation pattern) may be experienced in the inertial sensor based positioning.

Since a GPS (Global Positioning System) that is extensively used for location estimation receives a signal transmitted from satellite to calculate a location, LOS (line of sight) between satellite and the user equipment should be assured to enable positioning. Thus, it is difficult to perform positioning based on the GPS in an indoor area where it is difficult to receive a GPS signal. Although an IPS (indoor positioning system) based on a Wi-Fi signal is widely used to perform location estimation indoors, the IPS based on Wi-Fi has the following problems: 1) since the triangular method is used for location estimation, signals should be received from three or more APs to enable positioning; 2) due to time delay for transmission and reception of the Wi-Fi signal, it is difficult to perform real-time tracking and a positioning error occurs; 3) throughput is reduced by change of Infra; 4) the cost for establishment and update of DB is caused if RSSI is used; and 5) it may be difficult to estimate a location of a hidden node.

To overcome the problems of the WPS (Wi-Fi positioning system) and provide exact indoor positioning information, the present invention suggests a method for providing location information by using Wi-Fi signals received indoors by the user equipment from three or less APs and the inertial sensor (e.g., accelerometer, gyroscope, and geomagnetic sensor) of the user equipment. The Wi-Fi used in the present invention may be replaced with another indoor wireless communication system Bluetooth, UWB, zigbee, NFC (Near Field Communication), RFID (Radio Frequency Identification), etc.

Embodiment 1

First UE Based Hybrid Positioning Method

Generally, the locations of the APs installed indoors may be varied as the case may be without being installed in a given location at a given interval. Also, since a service range is varied for each AP, it is difficult for the user equipment to always receive signals from three or more APs. When the user equipment performs positioning by using the signals received from the Wi-Fi AP, it is difficult to acquire positioning information, that is, location information if the number of APs, which have transmitted the signals, is less than 3. In this specification, the case where the number of APs, which have transmitted the signals, is less than 3 when the user equipment performs positioning means that the number of APs, which have transmitted beacon signals, is less than 3 as a result of decoding performed by the user equipment that has received the beacon signals from the APs, wherein the beacon signals include AP identification information. In order to overcome the problems of the positioning method based on the Wi-Fi signals and improve positioning accuracy, in the present invention, the user equipment may acquire its location information by storing AP information and distance information, which are acquired through the received signals (e.g., Wi-Fi, Bluetooth, NFC, Zigbee), and using information measured through a sensor therein. The location estimation method of the user equipment may be described as illustrated in FIG. 5 below.

Figure 5:
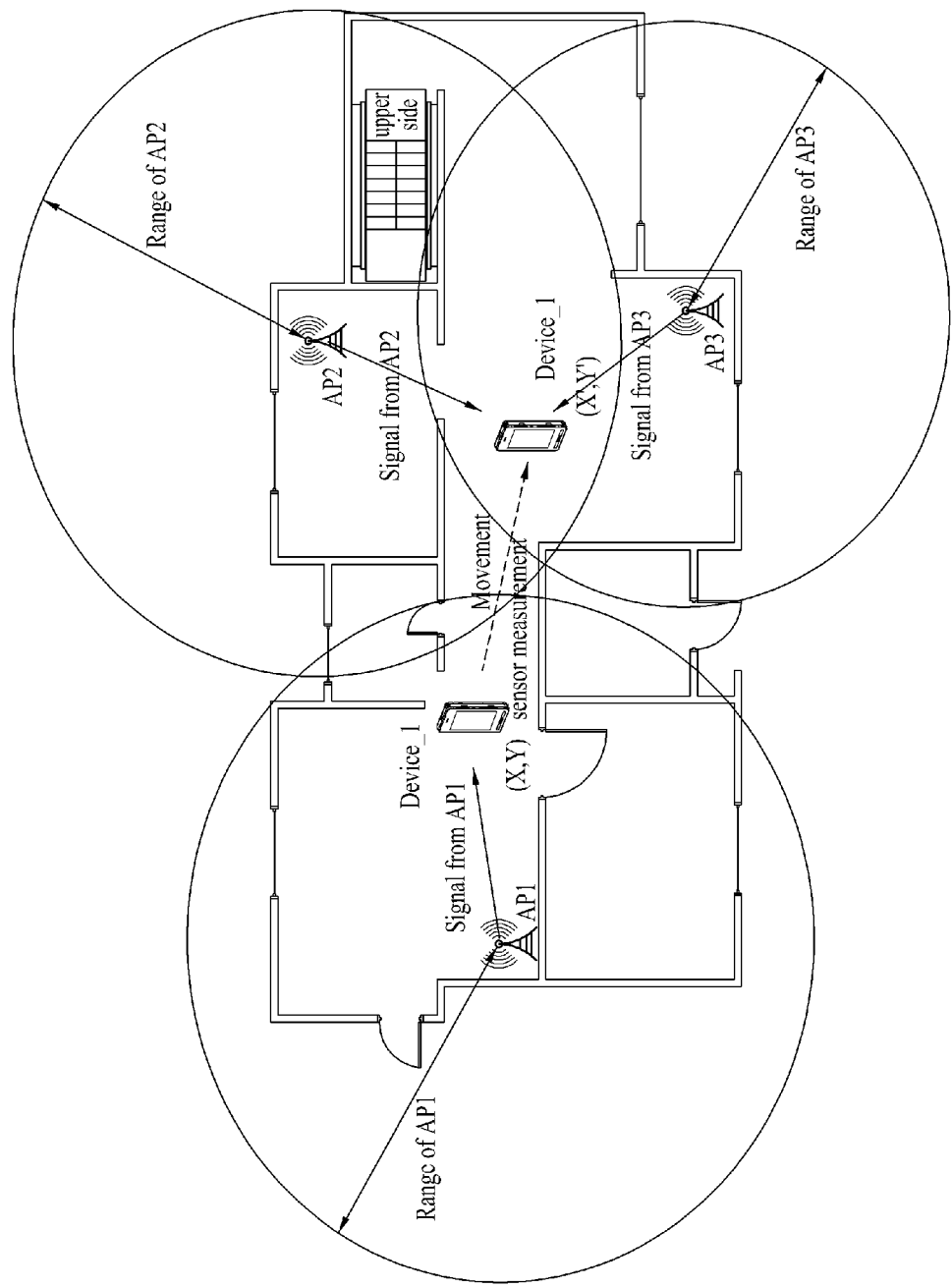
FIG. 5 is a conceptional diagram illustrating a user equipment based indoor hybrid positioning according to the embodiment 1 of the present invention.
Figure 6:
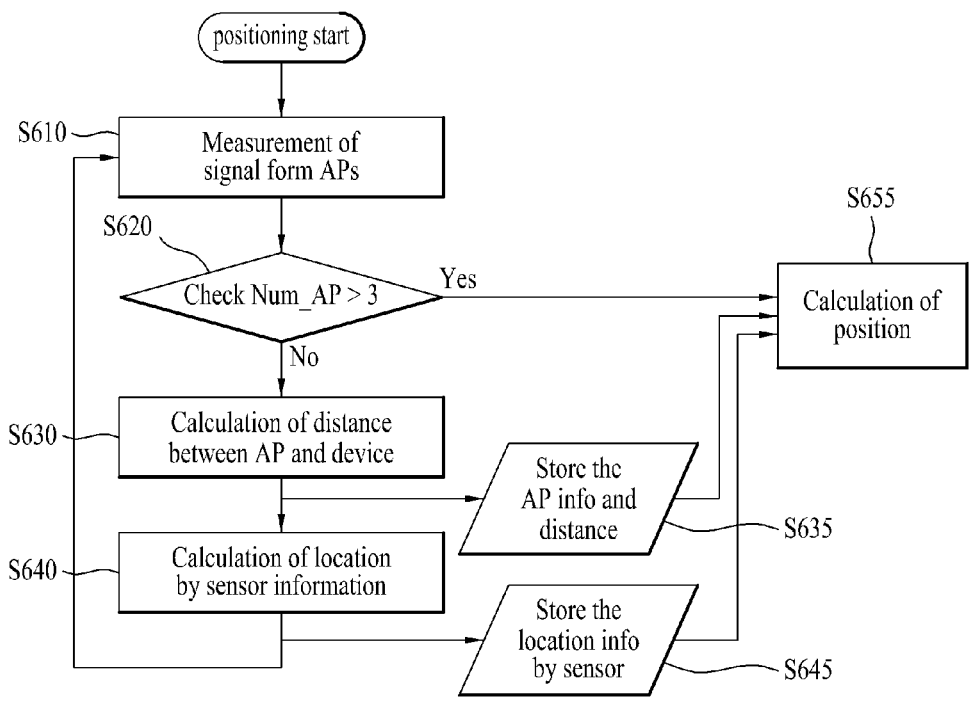
FIG. 6 is an exemplary diagram illustrating a user equipment based indoor hybrid positioning procedure.

FIG. 5 is a conceptional diagram illustrating a user equipment based indoor hybrid positioning according to the embodiment 1 of the present invention, and FIG. 6 is an exemplary diagram illustrating a user equipment based indoor hybrid positioning procedure.

As illustrated in FIG. 5, the APs installed indoors may respectively be located at random locations, and their ranges may be different from each other. The user equipment cannot always receive the signals from three APs due to difference in the location and range of the APs. Accordingly, the user equipment is indoors operated as follows to acquire location information.

The user equipment may identify information on the APs by indoors receiving the signals (e.g., beacon signals) from the APs (S610). The user equipment may acquire AP identifier (AP_ID) and AP location information, which are transmitted by being included in the signals received from the APs, through the received signals. Also, the user equipment may identify the distance from the APs, RSSI, time of arrival (ToA) information of the signals, time of departure (ToD) information of transmitted signals (or frames), etc. by using the signals received from the APs. At this time, the signals received by the user equipment may be beacon signals or reference signals, which are transmitted from the APs.

For example, as illustrated in FIG. 5, if the user equipment 1 device_1 starts location estimation at a point (X,Y), the user equipment 1 may calculate information on the AP 1 (including identifier information of the AP 1) and the distance with the AP 1 by receiving the signal from the AP 1. In particular, if it is determined that the number of APs identified through the received signals is less than 3 (S620), the user equipment calculates the received AP information and the distance with the AP (S630), and stores distance information with the AP, location information of the AP, identifier information of the AP in the memory 160 (S635). For example, in FIG. 5, since the user equipment 1 receives the signal from the AP 1 only, the user equipment 1 stores the information of the AP 1 and the distance information with the AP 1 therein. In this case, the distance between the user equipment and the AP may be calculated by the user equipment by using RSSI, ToA or ToD as follows.

Case 1: Usage of RSSI

The user equipment measures intensity of the received signals by using the Wi-Fi signals received from the respective APs. The user equipment that has measured intensity of the received signals from the respective APs may measure the distance with the AP through various methods based on the measured intensity of the received signals. For example, the intensity of the received signals and the distance between the two points may be expressed by the following Equation 2 in accordance with the formula of Friis.

$$L = 20\log_{10}\left(\frac{4\pi d}{\lambda}\right)[dB] \qquad [\text{Equation 2}]$$

The distance between the two points may be expressed by the following Equation 3 from the Equation 2.

$$d = \frac{\lambda}{4\pi} \cdot 10^{\frac{L}{20}} = \frac{c}{4\pi f} \cdot 10^{\frac{L}{20}} \qquad [\text{Equation 3}]$$

In this case, L represents the intensity of the received signals, d represents the distance between the user equipment and the AP, f represents frequency of the received signals, and c represents the velocity of light. In this case, the equation used to obtain the distance may be varied by a parameter that considers the environment.

Case 2: Usage of ToD or ToA

If ToD is used, the user equipment may identify a start time $T_s$ when the signals from the APs have been transmitted, through the signals received from the APs. Accordingly, the user equipment may calculate the time $T_t$ required to transmit the signals, by using the time $T_r$ when the signals are received from the APs and the start time $T_s$ when the received signals start to be transmitted.

$$T_t = T_r - T_s$$

Accordingly, the distance between the AP and the user equipment may be obtained using ToD as follows.

$$D = C \times T_f \text{ where } C = 3 \times 10^8 \text{ m/s}$$

If ToA is used, the user equipment may transmit a reference signal or a probe request signal to the AP and calculate ToA as follows through reception of a response signal to the transmitted signal.

$$ToA => T_f = \frac{T_{round} - T_{reply}}{2}$$

Accordingly, the distance between the AP and the user equipment may be obtained using ToA as follows.

$$D = C \times T_f \text{ where } C = 3 \times 10^8 \text{ m/s}$$

The user equipment may acquire information on a movement distance based on movement of the user equipment and a movement direction of the user equipment by using information acquired through a sensor until next AP signal measurement is performed (S640). For example, if the user equipment 1 moves from (X, Y) to (X', Y') in FIG. 5, the user equipment 1 may calculate information on a relative distance where the user equipment 1 moves from (X, Y) and a movement direction by using a value measured through a sensor (ex., Accelerometer, Gyroscope, Geo-magnetic, etc.) built therein (S640). Since the user equipment 1 does not know a coordinate value of (X, Y) currently, the user equipment 1 calculates the information on the movement distance from (X, Y) and the movement direction, which are obtained through the sensor, and stores the calculated result in a buffer or the memory 160 (S645).

Afterwards, the user equipment (e.g., user equipment 1) performs AP signal measurement and identifies whether the signals received during AP signal measurement are transmitted from the same AP or different APs. If it is identified that the signals received during AP signal measurement are transmitted from the same AP, the user equipment updates the stored AP information by using the received signals. By contrast, if it is identified that the signals received during AP signal measurement are transmitted from different APs other than the stored AP, the user equipment stores information on the corresponding AP and information on the distance as described above. For example, in FIG. 5, since the user equipment 1 moves to (X', Y') during next AP signal measurement, the user equipment 1 receives the signals from the AP 2 and the AP 3 at the location of (X', Y'). Accordingly, the since the user equipment receives the signals from the other APs different from the AP 1 from which the signals are first transmitted, the user equipment acquires information of the other APs through the receives signals, calculates the distance with the other APs and stores the calculated result. The user equipment checks the number of APs (including the stored AP, that is, location information of AP 1 may be stored) that have received the signals. If the number of APs is less than 3, the user equipment repeatedly performs the aforementioned steps until the signals other than the stored AP signal are received. If the number of APs is 3 or more (AP1, AP2, AP3, etc.), the user equipment performs location calculation for obtaining location information by using information of the stored AP and sensor information.

The user equipment may acquire location information by calculating its location using information identified through the signals received from three or more APs and location information measured through the sensor. For example, as illustrated in FIG. 5, the user equipment may discover a coordinate value of the current location (X', Y') by using the following Equation 4 through AP location information (location information of AP1, AP2, and AP3) acquired through the signals received from three or more APs, information on the distance with the APs, and movement information (movement distance and movement direction) of the user equipment, which is acquired through the sensor.

$$(D_1 + D_4) = \sqrt{(x_1 - x')^2 + (y_1 - y')^2}$$

$$D_2 = \sqrt{(x_2 - x')^2 + (y_2 - y')^2}$$

$$D_3 = \sqrt{(x_3 - x')^2 + (y_3 - y')^2} \qquad [\text{Equation 4}]$$

In this case, $D_1$, $D_2$, and $D_3$ respectively represent the distances between the AP1 and the user equipment 1, between the AP2 and the user equipment and between the AP3 and the user equipment. $D_4$ represents the distance obtained using the relative movement distance of the user equipment and the movement direction, which are measured by the sensor in accordance with movement of the user equipment. $(x_1, y_1)$, $(x_2, y_2)$ and $(x_3, y_3)$ represent location information of the respective APs, and (x',y') represents the location of the user equipment. The user equipment may acquire current location information by discovering the value of (x',y'), which is the current location, using the Equation 4.

Embodiment 2

Second UE Based Hybrid Positioning Method

As a calculation method different from the embodiment 1, the second UE based hybrid positioning method will be described.

Figure 7:
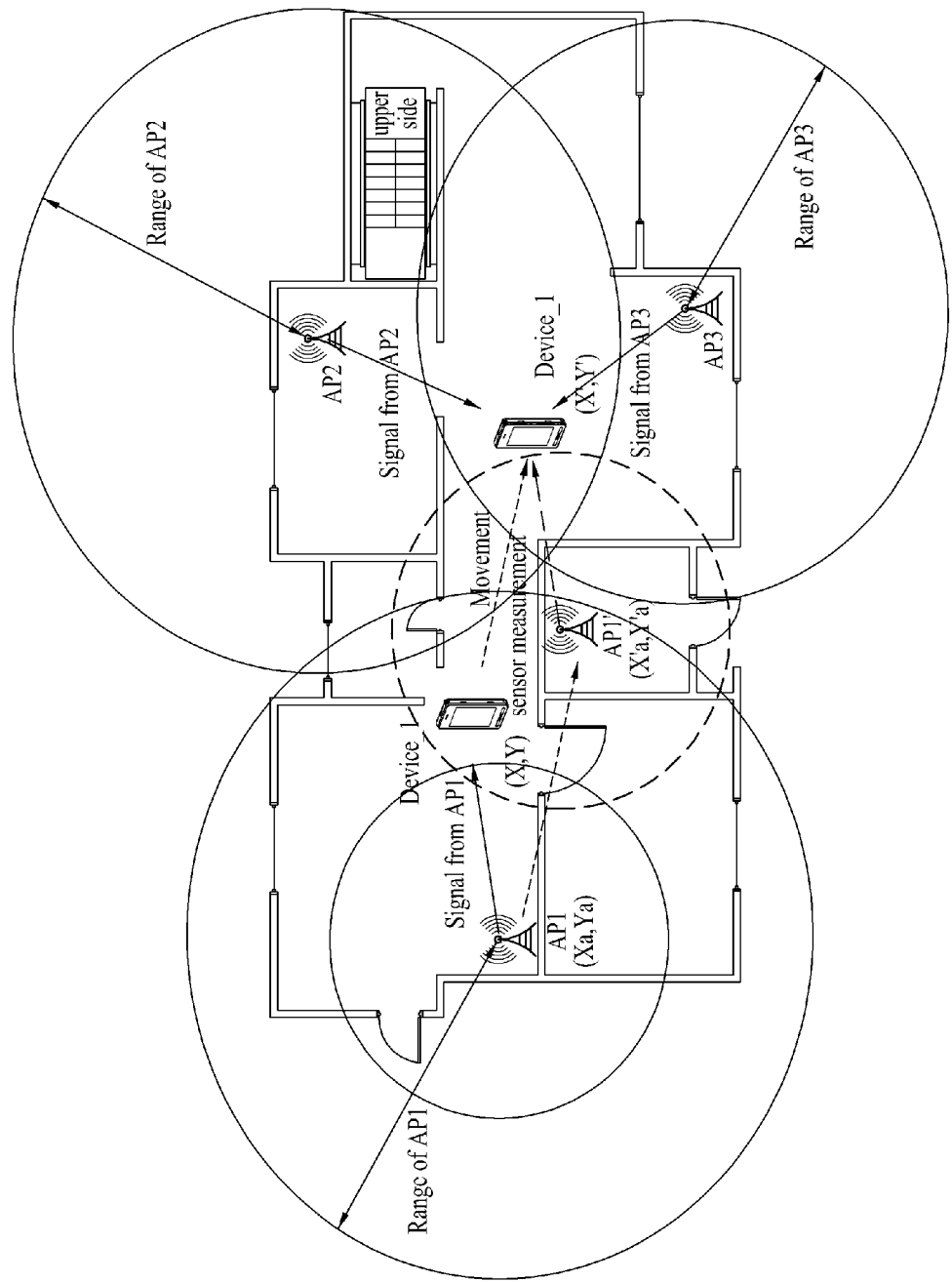
FIG. 7 is a conceptional diagram illustrating a user equipment based indoor hybrid positioning according to the embodiment 2 of the present invention.

FIG. 7 is a conceptional diagram illustrating a user equipment based indoor hybrid positioning according to the embodiment 2 of the present invention.

As illustrated in FIG. 7, the APs are installed indoors at random locations, and their ranges are different from one another. The user equipment cannot always receive the signals from three APs due to the difference in the location and range of the APs. Accordingly, the user equipment is indoors operated as follows to acquire location information.

The user equipment may identify information on the APs by indoors receiving the signals (e.g., beacon signals) from the APs. The user equipment may acquire AP identifier (AP_ID) and AP location information, which are transmitted by being included in the received signals from the APs. Also, the user equipment may identify the distance from the APs, RSSI, time of arrival (ToA) information of the signals, time of departure (ToD) information of transmitted signals (or frames), etc. by using the signals received from the APs. At this time, the signals received by the user equipment may be beacon signals or reference signals, which are transmitted from the APs.

The user equipment identifies the number of APs through the received signals, and if the number of APs is less than 3, the user equipment stores the location of the acquired APs, distance information with the APs, and AP identifier information. For example, since the user equipment 1 (device 1) receives the signal from the AP 1 only in FIG. 7, the user equipment 1 stores the location information of the AP1, the location of the acquired APs, the distance information with the AP 1 and AP identifier information in the memory 160.

The user equipment may acquire information on a movement distance based on movement of the user equipment and a movement direction of the user equipment by using information acquired through the sensor until next AP signal measurement is performed. For example, if the user equipment 1 moves from (X, Y) to (X', Y') in FIG. 7, the user equipment 1 may calculate information on a relative distance where the user equipment 1 moves from (X, Y) and a movement direction by using a value measured through a sensor (ex., Accelerometer, Gyroscope, Geo-magnetic, etc.) built therein. Since the user equipment 1 does not know a coordinate value of (X, Y) currently, the user equipment 1 calculates the information on the movement distance from (X, Y) and the movement direction, which are obtained through the sensor, and stores the calculated result in a buffer or the memory 160.

Afterwards, the user equipment (e.g., user equipment 1) performs AP signal measurement and identifies whether the signals received during AP signal measurement are transmitted from the same AP or different APs. If it is identified that the signals received during AP signal measurement are transmitted from the same AP, the user equipment updates the stored AP information by using the received signals. By contrast, if it is identified that the signals received during AP signal measurement are transmitted from different APs other than the stored AP, the user equipment stores information on the corresponding AP and information on the distance as described above. For example, in FIG. 7, since the user equipment 1 moves to (X', Y') during next AP signal measurement, the user equipment 1 receives the signals from the AP 2 and the AP 3 at the location of (X', Y'). Accordingly, the since the user equipment receives the signals from the other APs different from the AP 1 from which the signals are first transmitted, the user equipment acquires information of the other APs through the receives signals, calculates the distance with the other APs and stores the calculated result. The user equipment checks the number of APs (including the stored AP, that is, location information of AP 1 may be stored) that have received the signals. If the number of APs is less than 3, the user equipment repeatedly performs the aforementioned steps until the signals other than the stored AP signal are received. If the number of APs is 3 or more (AP1, AP2, AP3, etc.), the user equipment performs location calculation for obtaining location information by using information of the stored AP and sensor information.

The user equipment provides a virtual location to a previous AP by using the information identified through the signals received from the three or more APs and the location information measured through the sensor, and acquires the location information by calculating its location by using the virtual location. For example, as illustrated in FIG. 7, if the number of the signals received from the APs is 3 or more at the moved location (X', Y') of the user equipment 1, that is, if the signals are received from three or more APs, the user equipment 1 assumes that the AP1 is located at a virtual location $(X'_a, Y'_a)$ by correcting the location information of the AP1, which does not receive the signals any more, by using movement location information (difference between two locations when the first location of the user equipment 1 is (X, Y) and the current location after movement is (X', Y') estimated through the sensor. The user equipment performs positioning by the distance information with the AP1, which is acquired through the signals received at (X, Y), and distance information between the AP2 and the AP3, which is received at (X', Y') which is the movement location of the user equipment 1. That is, the location of the user equipment 1 may be identified using the distance information of three reference points (AP1, AP2, AP3) measured at the movement location (X', Y'). At this time, a location (=virtual location) $(X'_a, Y'_a)$ of the virtual reference point of the AP1 may be calculated using the following Equation 5.

$$(X'_a, Y'_a) = (X_a X_D, Y_a + Y_D)$$

$$(X'_a, Y'_a) = (X_a + (X'-X), Y_a + (Y'-Y))$$

$$D_2 = \sqrt{(x_2-x')^2 + (y_2-y')^2}$$

$$D_3 = \sqrt{(x_3-x')^2 + (y_3-y')^2} \qquad \text{[Equation 5]}$$

In this case, (X,Y) represents an initial location (=location obtained by measuring the distance with the AP1), (X', Y') represents the current location (location where the AP2 and the AP3 are received at the same time) of the user equipment 1, $(X_a, Y_a)$ represents the location (=location obtained by measuring the distance between the user equipment 1 and the AP1) of the AP1, and $(X'_a, Y'_a)$ represents the virtual location (=location obtained by correcting movement location measured by the sensor with respect to the location of the AP1) of the AP1. In the Equation 5, location information $(X_D=(X'-X), Y_D=(Y'-Y))$ added to the location information of the AP is relative location information measured through the sensor. (x2, y2) is the location of the AP2, and (x3, y3) is the location of the AP 3.

In FIG. 7, the user equipment 1 may calculate its current location by calculating the operations of the Equation 5.

Embodiment 3

Infra Based Hybrid Positioning Method

Figure 8:
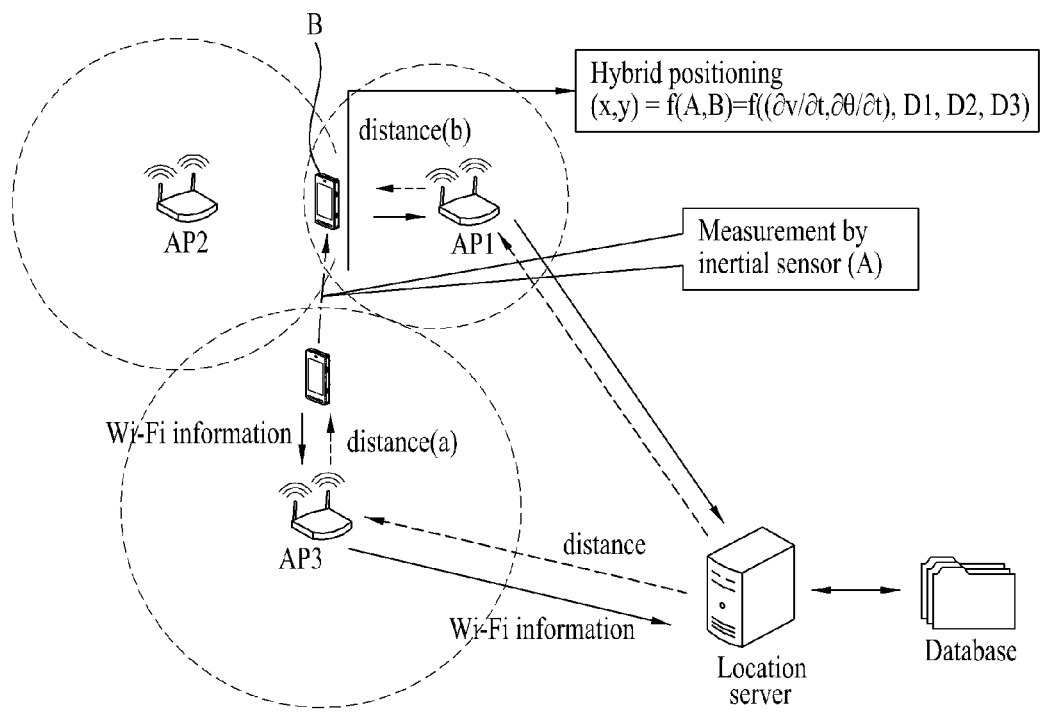
FIG. 8 is a conceptional diagram illustrating an infra based hybrid positioning method according to the embodiment 3 of the present invention.

FIG. 8 is a conceptional diagram illustrating an infra based hybrid positioning method according to the embodiment 3 of the present invention.

As described above, since the locations of the APs installed indoors and service ranges are different from one another, the user equipment may not receive the signals from three or more APs indoors. In this hidden node, the user equipment does not receive the signals required for location estimation, thereby failing to acquire location information. In this hidden node, the user equipment may estimate the location by using the following methods.

Usage of RSSI Based Fingerprinting

Case 1—Location Estimation at User Equipment

For indoor location estimation, the user equipment may identify AP information (ID, location), RSSI, etc. by receiving the signals (ex., Beacon, reference) transmitted from neighboring APs. At this time, the user equipment identifies the number of APs measured through the received signals. The user equipment transmits AP information (AP ID, AP location, etc.) identified through the signals received from the APs, UE ID, and RSSI to a location server through the APs or base station. The location server that has received the information from the user equipment measures the distance between the corresponding user equipment and the AP by using RSSI and transmits the measured distance information to the user equipment through the AP or base station.

The user equipment that has received the distance information with the AP through infra stores the distance information with the AP and location information of the AP in the memory 160 or buffer. The user equipment measures the information of the AP and RSSI through the signal received from the AP next time. At this time, the user equipment compares the identified AP information with the stored AP information to identify whether the identified AP and the stored AP are the same APs or different APs, thereby identifying a total number of received APs. Also, the user equipment transmits the AP information identified through the received signals, AP ID and RSSI to the location server. The location server that has received the above information from the user equipment calculates the distance between the user equipment and the AP and transmits the calculated result to the user equipment through the base station or AP.

Also, the user equipment performs measurement for its movement for an interval where the signals transmitted from the AP are measured, by using the inertial sensor built therein. The user equipment may calculate the current location by using its movement information obtained through sensor measurement and the distance information with the AP, which is transmitted from the location server. For example, as illustrated in FIG. 8, the user equipment indoors receives the signal from the AP3 only due to range of the AP at a point A. The user equipment that has received the signal of the AP3 acquires the number of APs and AP information (location information, ID) by using the signal and transmits the acquired information and measured RSSI to the location server through the AP3 or cellular base station. The location server calculates the distance between the AP3 and the base station by using the received information and DB. The DB may be used for mapping a distance suitable for the received RSSI into distance information between the user equipment and the AP configured based on RSSI. The location server transmits the measured distance information to the user equipment through the AP3 (or base station), and the user equipment that has received the information stores the AP information and the distance information in the buffer or the memory 160.

When the user equipment moves to a point B (signal from the AP3 is not received), the user equipment calculates information on a movement distance and a movement direction through measurement of the inertial sensor (for example, gyro sensor, acceleration sensor, geomagnetic sensor, pressure sensor) and stores the calculated result therein. At the point B, the user equipment receives the signals from the AP1 and the AP2, checks the number of APs received through the received signals, and transmits the identified AP information and RSSI information to the location server, thereby receiving the distance information from the location server. The user equipment that has received the distance information from the location server calculates positioning if the number of APs that have received the signals is 3 or more.

The user equipment calculates positioning by using the AP3 information which is previously stored and the AP1 and AP2 information which is newly transmitted. At this time, as the distance information from the AP3 strays from the range of the AP3, it is difficult to rely on the distance information from the AP3 any longer. Accordingly, the user equipment again measures the distance from the AP3 by using the information on the movement distance and the movement direction, which are measured through the sensor, to reduce the estimated error. In this way, the user equipment that has acquired the distance information from each AP may acquire the location information by applying the location information of the AP and the distance information to the triangular positioning algorithm in the embodiment 1 as one example.

Case 2—Acquisition of Location Information Calculated in Infrastructure

Unlike the case 1 where the user equipment directly calculates the location by using the movement information (distance, direction) measured through the sensor by receiving the distance information with the AP from the infrastructure, the user equipment may obtain the location information through the following operation.

The user equipment transmits RSSI, AP information (ID, position) and UE ID, which are measured through the received AP signals, to the location server. The location server that has received the information stores the received information in the buffer or the memory 160. Also, the user equipment transmits the movement information measured through the sensor to the location server together with the received information. At this time, the movement information may be either low data (angular velocity, angular acceleration, etc.) obtained through the sensor or information (movement distance, movement direction) calculated through the low data. The location server that has received the information from the user equipment calculates positioning for the user equipment if the number of APs transmitted from the user equipment is 3 or more. At this time, LS compensates the distance and location information from the AP, which is not measured at a hidden node, by using the information measured through the sensor in the same manner as the embodiment 1, for example. The location server that has calculated positioning of the user equipment by using the information transmitted from the user equipment transmits the location information to the user equipment through the AP or the base station. In this way, the user equipment acquires the current location.

Embodiment 4

Hybrid Positioning Method Through Channel Prediction

The user equipment should receive the signals at least three reference points (ex., APs) to estimate a location in the same manner as the embodiments 1 to 3. However, a hidden node is generated by range, transmission power and location of the APs. If it is difficult to perform positioning due to the hidden node and decrease of the APs detected by movement of the user equipment, the user equipment may perform positioning by using the following method.

As illustrated in FIG. 5, the user equipment may identify information on the APs by indoors receiving the signals (for example, beacon signals) from the APs. The user equipment may acquire AP identifier (AP ID) and AP location information, which are transmitted by being included in the received signals, through the received signals received from the APs. The user equipment may identify the distance from the APs, RSSI, time of arrival (ToA) information of the signals, time of departure (ToD) information of transmitted signals (or frames), etc. by using the signals received from the APs. At this time, the signals received by the user equipment may be beacon signals or reference signals, which are transmitted from the AP.

The user equipment identifies the number of APs through the received signals, and if the number of APs is less than 3, the user equipment stores the identified information in the buffer or the memory 160. The user equipment may acquire information on the movement distance and the movement direction of the user equipment by using the information obtained through the sensor until next AP signal measurement is performed. The information on the movement distance and the movement direction, which is acquired through the sensor, is stored in the buffer or the memory 160. Accordingly, the user equipment stores at least one of the following information in the buffer or the memory 160:

1) movement distance measured by the sensor;
2) movement direction measured by the sensor;
3) RSSI (or RSS) measured from the APs, which may include a prediction value estimated through combination with information measured through the sensor based on channel prediction; and
4) ToA measured from the APs, which may include a prediction value estimated through combination with information measured through the sensor based on channel prediction.

Afterwards, the user equipment performs AP signal measurement and identifies whether the signals received during AP signal measurement are transmitted from the same AP or different APs. If it is identified that the signals received during AP signal measurement are transmitted from the same AP, the user equipment updates the stored AP information by using the received signals. By contrast, if it is identified that the signals received during AP signal measurement are transmitted from different APs other than the stored AP, the user equipment stores information on the corresponding AP and information on the distance as described above. For example, in FIG. 5, since the user equipment 1 moves to (X', Y') during next AP signal measurement, the user equipment 1 receives the signals from the AP 2 and the AP 3 at the location of (X', Y').

Accordingly, the since the user equipment receives the signals from the other APs different from the AP 1 from which the signals are first transmitted, the user equipment acquires information of the other APs through the receives signals, calculates the distance with the other APs and stores the calculated result. The user equipment checks the number of APs (including the stored AP, that is, location information of AP 1 may be stored) that have received the signals. If the number of APs is less than 3, the user equipment repeatedly performs the aforementioned procedure until the signals other than the stored AP signal are received. If the number of APs is 3 or more (AP1, AP2, AP3, etc.), the user equipment performs location calculation for obtaining location information by using information of the stored AP and sensor information.

As described above, the user equipment calculates its location by using the information identified through the signals received from three or more APs and positioning information measured through the sensor, thereby acquiring the location information. RSSI (or RSS) and ToA stored by the user equipment may include the prediction value estimated through combination with the information measured through the sensor.

For example, RSSI (or RSS) measured from the AP (AP1 in FIG. 5) may be measured within a valid radius only. Accordingly, a value of a virtual valid range based on movement of the user equipment may be predicted/estimated based on change of RSSI (or RSS) according to the movement distance and movement direction from the point (X, Y), and then may be stored. This may equally be applied to ToA. Also, the user equipment uses an equation to which RSSI is applied, to obtain a prediction value estimated through a relation between the measured RSSI (or RSS) and the movement distance, wherein the equation may be changed and applied by an environment parameter measured by the user equipment.

As described above, if it is difficult to estimate the location due to movement of the user equipment or movement of the AP, the user equipment may obtain predicted positioning information on a virtual range through Wi-Fi signal information which is conventionally measured, and calculates the current location by combining the predicted positioning information with the positioning information measured through the sensor or giving a weighting value.

The user equipment combines the positioning information predicted for the virtual range with the positioning information measured through the sensor through the information identified through the signals received from the three or more APs and the Wi-Fi signal information which is conventionally measured or calculates the current location by using the portion to which the weighting value is given.

The aforementioned embodiments 1 to 4 according to the present invention relate to the case where the number of APs (ex., reference points) for location estimation is insufficient. The present invention may be applied to even the case where the number of APs for location estimation is reduced due to movement of the user equipment that currently performs location estimation.

The aforementioned embodiments are achieved by combination of structural elements and features of the present invention in a predetermined type. Each of the structural elements or features should be considered selectively unless specified separately. Each of the structural elements or features may be carried out without being combined with other structural elements or features. Also, some structural elements and/or features may be combined with one another to constitute the embodiments of the present invention. The order of operations described in the embodiments of the present invention may be changed. Some structural elements or features of one embodiment may be included in another embodiment, or may be replaced with corresponding structural elements or features of another embodiment. Moreover, it will be apparent that some claims referring to specific claims may be combined with another claims referring to the other claims other than the specific claims to constitute the embodiment or add new claims by means of amendment after the application is filed.

It will be apparent to those skilled in the art that the present invention may be embodied in other specific forms without departing from the spirit and essential characteristics of the invention. Thus, the above embodiments are to be considered in all respects as illustrative and not restrictive. The scope of the invention should be determined by reasonable interpretation of the appended claims and all change which comes within the equivalent scope of the invention are included in the scope of the invention.

INDUSTRIAL APPLICABILITY

The method for estimating a location indoors in a wireless network and the device for the same may be used industrially.

The invention claimed is:

1. A method for measuring a location of a user equipment in a wireless network, the method comprising:
    determining, based on received signals, whether the number of access points (APs) that transmit the signals is three or more;
    storing location information of a first AP obtained based on the received signals and distance information between the user equipment and the first AP at a point where the signals are received, if the number of the APs is less than three;
    measuring a movement distance and a movement direction according to the movement of the user equipment from the point where the signals are received;
    obtaining, based on signals received from a second AP and a third AP, current location information of the second and third APs and distance information between the user equipment and each of the second and third APs at a current point, if it is determined that the number of the APs that transmit signals at the current point according to the movement to the user equipment is three or more;
    calculating a location of the current point of the user equipment based on the distance information between the user equipment and each of the second and third APs at the current point, the distance information between the user equipment and the first AP, the measured movement distance, and the measured movement direction; and
    wherein the step of calculating the location of the current point of the user equipment includes calculating a location (x', y') of the current point of the user equipment through the following Equation A:

$$(D_1+D_4)=\sqrt{(x_1-x')^2+(y_1-y')^2}$$

$$D_2=\sqrt{(x_2-x')^2+(y_2-y')^2}$$

$$D_3=\sqrt{(x_3-x')^2+(y_3-y')^2}, \qquad \text{[Equation A]}$$

where $D_1$, $D_2$, and $D_3$ respectively represent the distances between each of the first AP, the second AP and the third AP and the user equipment, $D_4$ represents the movement distance of the user equipment, which is measured in accordance with the movement of the user equipment, and $(x_1, y_1)$, $(x_2, y_2)$ and $(x_3, y_3)$ respectively represent locations of the first AP, the second AP and the third AP.

2. The method according to claim 1, wherein the user equipment is located indoors.

3. The method according to claim 1, wherein the step of determining, based on the received signals, whether the number of APs that transmit the signals is three or more includes determining whether the number of AP identifiers detected as a result of decoding performed by the user equipment is three or more.

4. A method for measuring a location of a user equipment in a wireless network, the method comprising:
    determining, based on received signals, whether the number of access points (APs) that transmit the signals is three or more;
    storing location information of a first AP obtained based on the received signals and distance information between the user equipment and the first AP at a point where the signals are received, if the number of the APs is less than three;
    measuring a movement distance and a movement direction according to the movement of the user equipment from the point where the signals are received;
    calculating a virtual location of the first AP by using the measured movement distance and movement direction from the obtained location information of the first AP if it is determined that the number of APs that transmit the signals to the user equipment is three or more;
    obtaining, based on signals received from a second AP and a third AP at a current point based on the movement, location information of the second and third APs and distance information between the user equipment and each of the second and third APs at the current point;
    calculating a location of the current point of the user equipment based on the virtual location of the first AP, the location information of the second and third APs, and the distance information between the user equipment and each of the second and third APs at the current point; and
    wherein the step of calculating the location of the current point of the user equipment includes calculating a location (x', y') of the current point of the user equipment through the following Equation B:

$$(X'_a, Y'_a)=(X_a+X_D, Y_a+Y_D)$$

$$(X'_a, Y'_a)=(X_a+(X'-X), Y_a+(Y'-Y))$$

$$D_2=\sqrt{(x_2-x')^2+(y_2-y')^2}$$

$$D_3=\sqrt{(x_3-x')^2+(y_3-y')^2}, \qquad \text{[Equation B]}$$

where $(X_D=(X'-X), Y_D=(Y'-Y), (X_D, Y_D)$ is a value added considering relative movement based on relative movement distance and movement direction according to the movement of the user equipment, (X, Y) represents a location obtained by measuring the distance between the user equipment and the first AP, (X', Y') represents the current location (location where $AP_2$ and $AP_3$ signals are received at the same time) of the user equipment, $(X_a, Y_a)$ represents the location (=location obtained by measuring the distance between the user equipment and the first AP) of the first AP, $(X'_a, Y'_a)$ represents the virtual location of the first AP, $(x_2, y_2)$ is a location of the second AP, and $(x_3, y_3)$ is a location of the third AP.

5. The method according to claim 4, wherein the step of determining, based on the received signals, whether the number of APs that transmit the signals is three or more includes determining whether the number of AP identifiers detected as a result of decoding performed by the user equipment is three or more.

6. A user equipment for measuring a location in a wireless network, the user equipment comprising:
    a location information module determining, based on received signals, whether the number of access points (APs) that transmit the signals is three or more;
    a memory storing location information of a first AP obtained based on the received signals and distance information between the user equipment and the first AP at a point where the signals are received, if the number of the APs is less than three; and
    a sensor measuring a movement distance and a movement direction according to the movement of the user equipment from the point where the signals are received, wherein the location information module is configured to:
obtain, based on signals received from a second AP and a third AP, current location information of the second and third APs and distance information between the user equipment and each of the second and third APs at a current point, if it is determined that the number of the APs that transmit signals at the current point according to the movement to the user equipment is three or more,
calculate a location of the current point of the user equipment based on the distance information between the user equipment and each of the second and third APs at the current point, the distance information between the user equipment and the first AP, the measured movement distance, and the measured movement direction, and
wherein the step of calculating the location of the current point of the user equipment includes calculating a location (x', y') of the current point of the user equipment through the following Equation A:

$$(D_1+D_4)=\sqrt{(x_1-x')^2+(y_1-y')^2}$$

$$D_2=\sqrt{(x_2-x')^2+(y_2-y')^2}$$

$$D_3=\sqrt{(x_3-x')^2+(y_3-y')^2},$$ [Equation A]

where $D_1$, $D_2$ and $D_3$ respectively represent the distances between each of the first AP, the second AP and the third AP and the user equipment, $D_4$ represents the movement distance of the user equipment, which is measured in accordance with the movement of the user equipment, and $(x_1, y_1)$, $(x_2, y_2)$ and $(x_3, y_3)$ respectively represent locations of the first AP, the second AP and the third AP.

7. A user equipment for measuring a location in a wireless network, the user equipment comprising:
a location information module determining, based on received signals, whether the number of access points (APs) that transmit the signals is three or more;
a memory storing location information of a first AP obtained based on the received signals and distance information between the user equipment and the first AP at a point where the signals are received, if the number of the APs is Jess than three; and
a sensor measuring a movement distance and a movement direction according to the movement of the user equipment from the point where the signals are received, wherein the location information module is configured to:
calculate a virtual location of the first AP by using the measured movement distance and movement direction from the obtained location information of the first AP if it is determined that the number of APs that transmit the signals to the user equipment is three or more,
obtain, based on signals received from a second AP and a third AP at a current point based on the movement, location information of the second and third APs and distance information between the user equipment and each of the second and third APs at the current point,
calculate a location of the current point of the user equipment based on the virtual location of the first AP, the location information of the second and third APs, and the distance information between the user equipment and each of the second and third APs at the current point, and
wherein the step of calculating the location of the current point of the user equipment includes calculating a location (x', y') of the current point of the user equipment through the following Equation B:

$$(X'_a, Y'_a)=(X_a+X_D, Y_a+Y_D)$$

$$(X'_a, Y'_a)=(X_a+(X'-X), Y_a+(Y'-Y))$$

$$D_2=\sqrt{(x_2-x')^2+(y_2-y')^2}$$

$$D_3=\sqrt{(x_3-x')^2+(y_3-y')^2},$$ [Equation B]

where $(X_D=(X'-X), Y_D=(Y'-Y), (X_D, Y_D)$ is a value added considering relative movement based on relative movement distance and movement direction according to the movement of the user equipment, (X, Y) represents a location obtained by measuring the distance between the user equipment and the first AP, (X', Y') represents the current location (location where $AP_2$ and $AP_3$ signals are received at the same time) of the user equipment, $(X_a, Y_a)$ represents the location (=location obtained by measuring the distance between the user equipment and the first AP of the first AP, $(X'_a, Y'_a)$ represents the virtual location of the first AP, $(x_2, y_2)$ is a location of the second AP, and $(x_3, y_3)$ is a location of the third AP.

* * * * *